May 1, 1951 G. I. BILYEU 2,550,666
DUAL PNEUMATIC CONTROLLER
Filed Feb. 10, 1949 3 Sheets-Sheet 1

INVENTOR
Gerald I. Bilyeu
BY
Curtis, Morris + Safford
ATTORNEYS

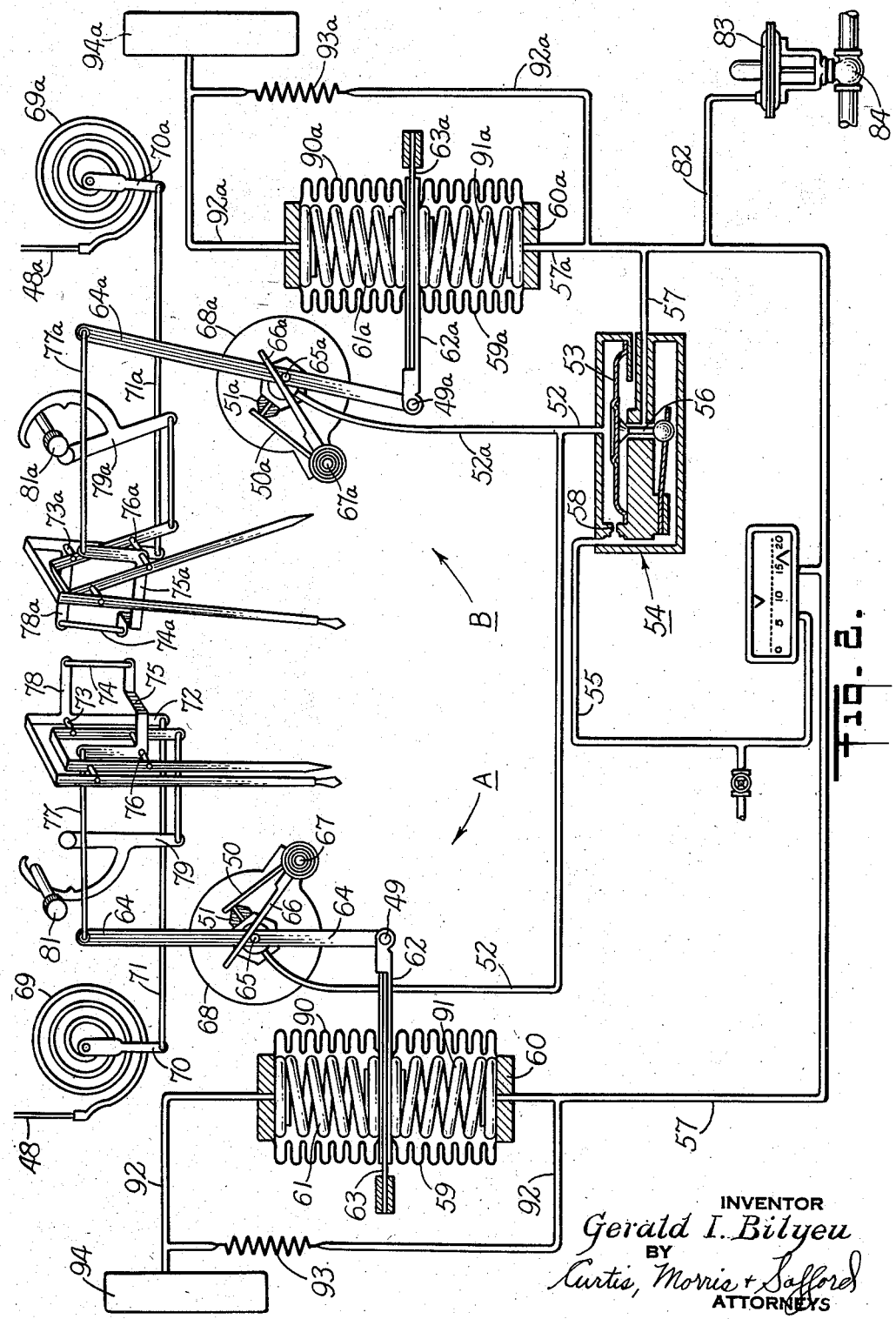

May 1, 1951 G. I. BILYEU 2,550,666
DUAL PNEUMATIC CONTROLLER
Filed Feb. 10, 1949 3 Sheets-Sheet 3
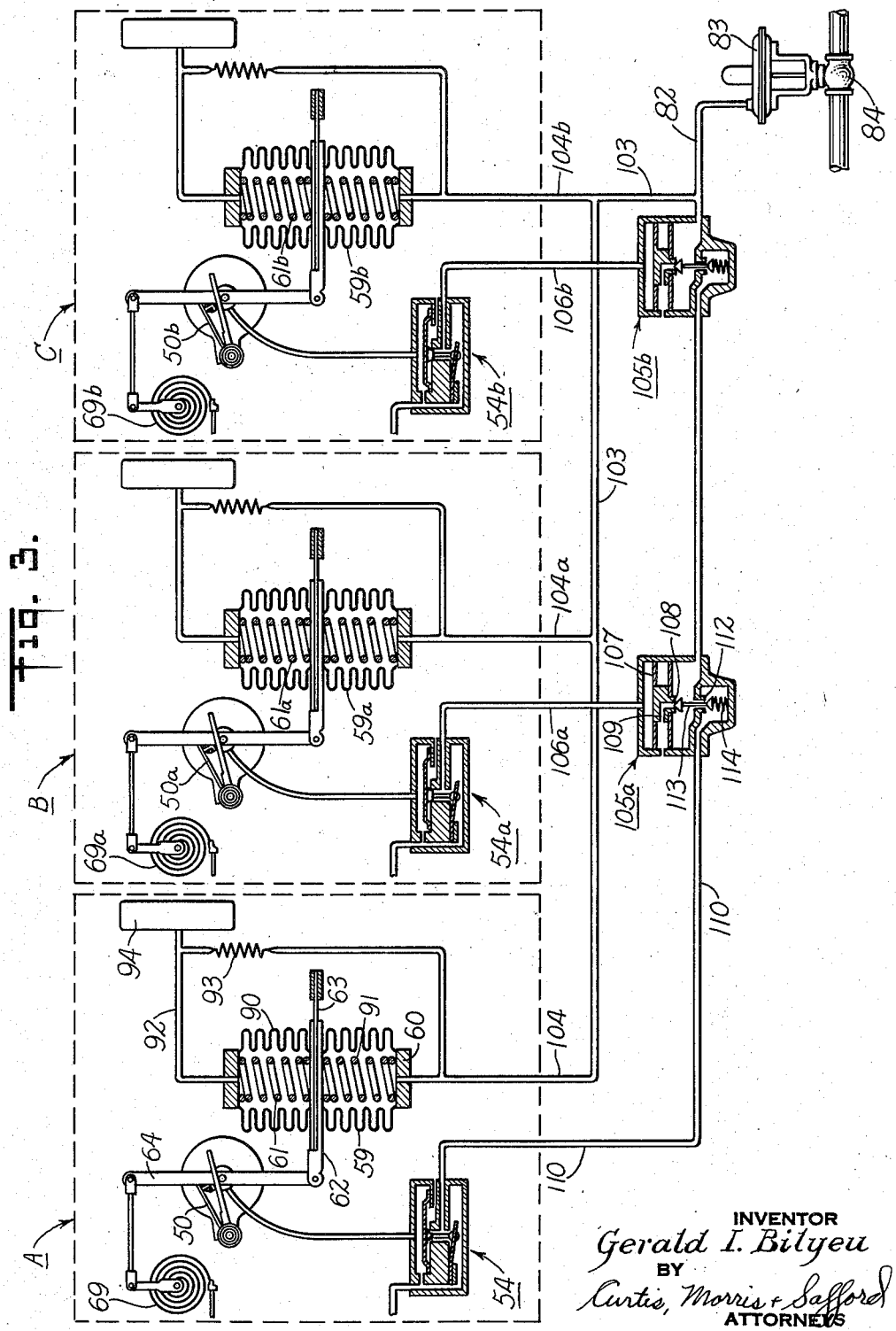
INVENTOR
Gerald I. Bilyeu
BY
Curtis, Morris & Safford
ATTORNEYS Patented May 1, 1951

2,550,666

UNITED STATES PATENT OFFICE 2,550,666

DUAL PNEUMATIC CONTROLLER

Gerald I. Bilyeu, Foxboro, Mass.

Application February 10, 1949, Serial No. 75,679

3 Claims. (Cl. 137—153)

The present invention relates to a novel combination of pneumatically-operated controller units to control selectively two or more interdependent variables with respect to desired limiting values by manipulating a single valve (operator) which regulates another variable that affects both interdependent variables.

The novel combination may be used, for example, to control the operation of a booster pump in a long pipe line. Here it is important to protect the pump from damage by preventing its intake pressure from going too low, and to protect the pipe line from damage by preventing the pump discharge pressure from going too high. The novel controller combination, in selective response to the pump intake pressure and the pump output pressure, regulates the overall operation of the pump to keep the intake pressure from going below a predetermined minimum value and to keep the output pressure from going above a predetermined maximum value.

The pump intake and output pressures are interdependent variables, in that they both are affected by the speed of the pump, and so may be controlled by a single valve or operator regulating the supply of energy to an engine driving the pump. Thus as the valve closes to reduce pump speed, the tendency is for the pump output pressure to lower and for the intake pressure to rise; and as the valve opens to increase the pump speed, the tendency is for the pump output pressure to increase and for the intake pressure to decrease.

The problem of controlling such interdependent variables to keep them within limits by manipulating a single operator that affects both has long existed, but no previous method employed has permitted use of controllers having both proportioning and reset characteristics.

One method employed has been to use in series two standard pneumatic proportioning control instruments employing bleed-type pilot valves (to be described) responsive respectively to the intake and output pump pressures, and so interconnected that the supply pressure to operate the second controller is the output pressure of the first control instrument. The output pressure of the second controller has been used to operate a valve motor regulating the speed of the engine driving the pump. To insure sufficient air supply to the bleed-type pilot valve of the second controller, a separate air supply should be and sometimes is connected to its pilot valve. In this arrangement so long as the first controller is in control, the second controller is inactive and merely acts to relay the output pressure of the first controller to the valve motor. But when the second controller is in control, it acts on and modifies the pressure received from the first controller to supply the control pressure to the valve motor. This arrangement has the disadvantage that control units having only proportioning control characteristics can be safely used. Control units with reset control cannot be used because the continued reset action in the inactive controller permits the desired limits to be exceeded before the transfer of control from the active to the inactive controller.

There are instances in which more than two interdependent values have to be controlled from a single regulated valve, and the above series arrangement of control units is unsatisfactory for this problem also.

It is an obejct of the present invention to provide a novel combination of control units having both proportioning and reset control characteristics that can control two or more interdependent variables above or below minimum or maximum values from a single operator, selectively operated by the control units. It is a further object to provide such a combination that utilizes standard pneumatically-operated control units, makes the transfer of control from one unit to the other at predetermined limit values, and without upsetting the process being controlled.

It has been discovered that the above may be accomplished with conventional pneumatically-operated control units employing the usual bleed-type pilot valve, and pneumatic follow-up and reset bellows operating either as a position follow-up or as a force-balancing follow-up, (1) by connecting in parallel the valve motor and the follow-up bellows, and (2) by interconnecting the pilot valves so that the control unit whose pilot valve has the lowest back pressure (i. e., air bleed resistance) controls the supply of air to the valve motor and to the follow-up bellows of each of the other controllers, and so that the idle controllers are continuously subjected to the output pressure of the active controller. In this way, whenever the air bleed resistance of the pilot valve of one control unit drops below that of the other control units (i. e., whenever the nozzle-back-pressure of one control unit tends to drop below that of the other control units) then that control unit assumes control. Since the pressure in its follow-up and reset bellows is the same as that in the bellows of the other control units, the transfer of control is accomplished without abrupt change in the output controller pressure and at the control point setting of the control unit assuming control.

The control units each have a measuring element respectively connected to the variables being controlled. They may be adjusted so one controls a high limit value and the other a low limit value; or high limit values of both variables may be controlled; or low limit values of both variables may be controlled. If more than two control units are employed, one unit may control a high limit value, another a low limit value, another a high limit value, another a low limit value, etc., or any other selection as desired.

Other objects will be in part obvious and in part pointed out by reference to the drawings in which like reference characters refer to similar parts throughout.

In the drawings:

Figure 2 shows diagrammatically, and partly in perspective, two control units interconnected as taught by the present invention; and Figure 3 shows diagrammatically another embodiment of the invention in which three control units are used to control from limits of three interdependent variables.

Figure 1:
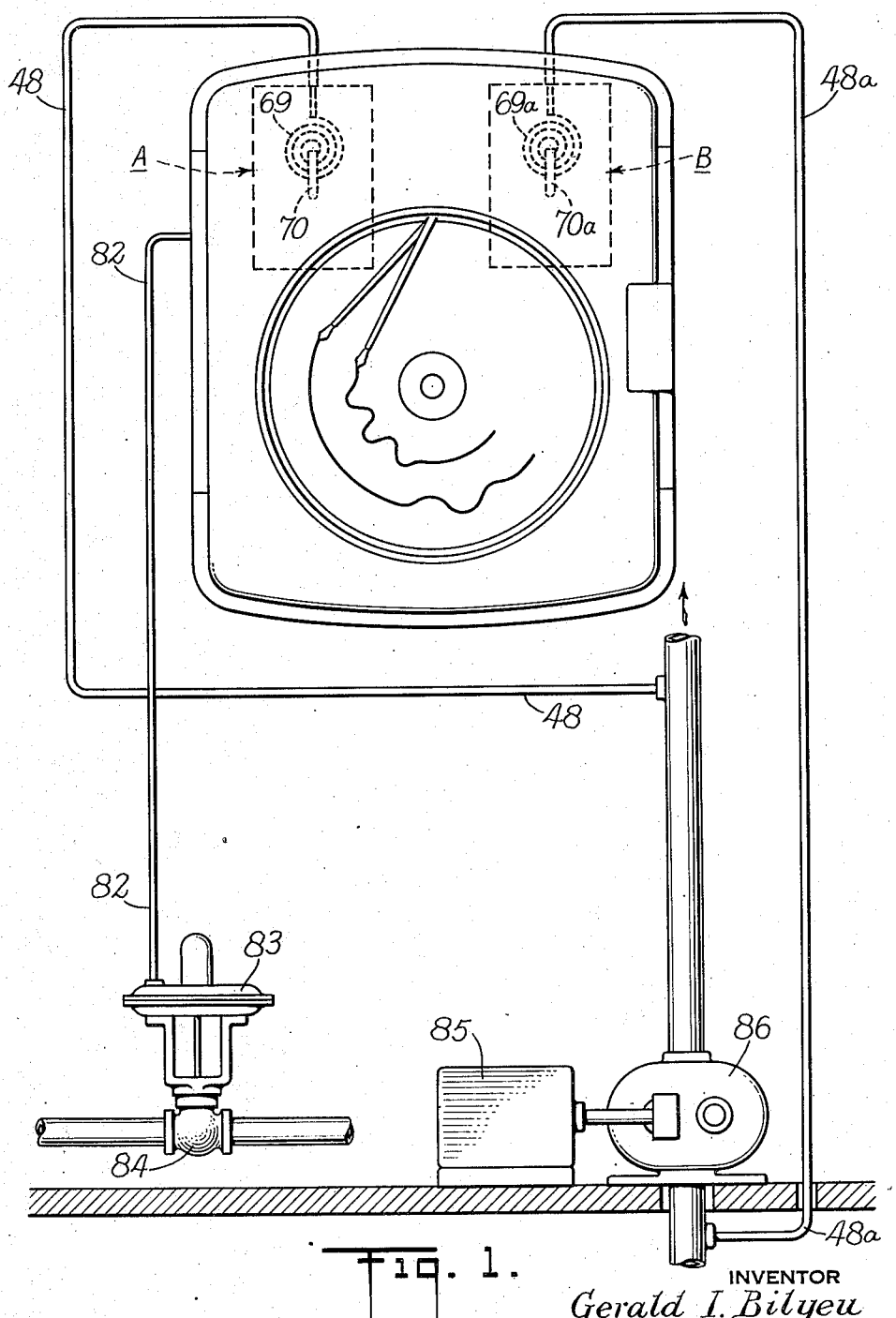
Figure 1 shows diagrammatically an application of the present invention to control the intake and output pressure of a pump by regulating the speed of an engine driving the pump.

Pneumatically-operated controllers of the proportioning-plus-reset type are shown in Mason Patent 1,897,135, and Philbrick Patent 2,360,889. Such controllers establish a pneumatic output control pressure which is a function of movement of a part positioned by a measuring element responsive to the value of the variable being controlled. The control pressure is a function of the position of the part, of its change of position, and of its deviation with respect to time from a control point value.

Referring to Figure 1, two control units of the type above described are shown in a single case. The measuring element of control unit A is connected by line 48 to the discharge pressure of a pump 86, and the measuring element of control unit B is connected by line 48a to the intake pressure of pump 86. The output control pressure of the controller (the two control units combined) goes to a diaphragm motor 83, which operates a valve 84 controlling the speed of the engine 85 driving pump 86.

Referring to Figure 2, there is shown control units A and B of Figure 1, each control unit being a proportioning controller with reset action. Both control units are of the same construction. Inasmuch as the mechanism disclosed operates in accordance with the principle described in the above-mentioned Mason patent and Philbrick patent, and is of the construction shown in the U. S. patent application of Bowditch, Serial No. 692,102, filed August 21, 1946, it is not necessary to go into a detailed description of the parts or of their sequence of operation. But for the convenience of the reader, control unit A is here briefly described.

Referring to the left hand side of Figure 2, the mechanism of control unit A includes a conventional bleed-type pilot valve, which in the present embodiment comprises flapper 50 and a nozzle 51 supplied with a restricted flow of air from a pipe 52. Movement of flapper 50 with respect to nozzle 51 within an operating range in the order of .001 inch, varies the air bleed resistance of the nozzle and varies the nozzle-back-pressure in pipe 52 between minimum and maximum limits. This nozzle-back-pressure (also herein called pilot valve output pressure) is applied to diaphragm 53 of a control relay valve generally indicated at 54. Relay valve 54 is supplied with a source of air supply (whose pressure may be, for example, 18 lbs.) from pipe 55, and diaphragm 53 operates a supply and waste valve mechanism 56 to supply air to or exhaust it from outlet pipe 57. The restricted flow of air to the nozzle 51 is provided through restriction 58 of relay valve 54.

Pipe 57 connects with proportioning (follow-up) bellows 59 whose bottom is secured as at 60, and whose upper end is spring-opposed by loading spring 61. Movement of flapper 50 relative to nozzle 51 varies the nozzle-back-pressure in pipe 52 and operates relay valve 54 to vary the air pressure in follow-up bellows 59, thereby to position its upper end against the resilient variable force of spring 61. Increase of nozzle-back-pressure produces increase of control relay output pressure and vice versa.

Between spring 61 and the upper end of bellows 59 is arm 62 flexibly pivoted at 63 and connected at 49 to floating arm 64 carrying operating pin 65. On pin 65 rests a flapper-operating arm 66 freely pivoted about shaft 67, and normally having a fixed relationship with respect to flapper 50.

Shaft 67, for purposes to be later described, is mounted on disc 68 which also carries nozzle 51. Disc 68 is rotatable about a fixed axis passing through its center. In operation the reaction between the nozzle and flapper, the control relay, the proportioning bellows, and floating arm 64, is such as to maintain in bellows 59 whatever pressure is required to position pin 65 up or down to maintain flapper 50 within its narrow operating range with respect to nozzle 51. Thus, if floating arm 64 pivots to the right about connection 49, pin 65 raises flapper-operating arm 66 and tends to move flapper 50 away from the nozzle with the result that nozzle-back-pressure in line 52 drops and relay valve 56 reduces the air pressure in pipe 57, and bellows 59 lowers floating arm 64 and pin 65 to maintain the operating relationship between flapper 50 and nozzle 51. The operation is rapid and continuous and is fully described in the above-mentioned patent application and patents.

The reset control characteristic, as is well known, works with the proportioning characteristic to maintain the variable being controlled at a control point, i. e., at a single predetermined value. The operation of the reset control characteristic in combination with the proportioning characteristic is fully described in the above-mentioned patent application and patents, and its operation will be described here only in generalities.

The reset control characteristic is performed by bellows 90, identical to and operating in opposition to bellows 59, a spring 91 opposing spring 61, and adjustable restriction 93 in pipe 92 connecting the interior of bellows 59 and 90. The usual capacity tank 94 is connected with bellows 90 to provide with the restriction 93 the desired "reset rate."

In operation, when the pressures in bellows 59 and 90 are equal, the springs 61 and 91 will always position arm 62 and pin 65 at a neutral or control point position. Also if the pressure in bellows 90 is above or below that in bellows 59, air will always flow from or to bellows 90 through restriction 93 to change the pressure therein in a direction toward equalizing it with the pressure in bellows 59. Thus, since the pressures always tend to equalize in bellows 59 and 90, and since when equalized they always position the pin 65 at a given elevation, there is only one value of the pressure in measuring element 69 that will hold the flapper 50 in operating relationship with nozzle 51 when the pressures in the two bellows are equal. It is through this operation that the reset control characteristic causes the control unit to tend to maintain the value of the pressure being measured by element 69 at a preset, control point value.

The upper end of floating arm 64 is horizontally positioned by a suitable measuring element, for example a spiral hollow tube 69 having an arm 70 which moves clockwise when pressure in the tube increases, and counter-clockwise when the pressure decreases. Element 69 is connected by suitable tube 48 to the pump discharge pressure (Figure 1). Arm 70 is connected by a link 71 to a bell crank member 72 pivoted about axis 73, and whose end 78 is connected by link 74 to one end of crank 75 pivoted about floating axis 76, and whose other end is connected by link 77 to the upper end of floating arm 64. Increase of pressure in measuring element 69 moves arm 70 clockwise and through the linkage mechanism described, pivots arm 64 clockwise to raise arm 66. This tends to move flapper 50 away from nozzle 51 and calls for a proportional reduction of pressure in bellows 59 to move pin 65 proportionately downwardly to maintain the flapper and nozzle in their operating range.

The linkage mechanism connecting the measuring element with arm 64 is shown in detail in U. S. Bowditch patent application, Serial No. 660,644, filed April 9, 1946, now Patent No. 2,455,326 of November 30, 1948. Movement of the floating axis 76 shifts the control point value, i. e., shifts up or down the pump discharge pressure value at which the control unit controls. Movement of axis 76 is accomplished by mounting floating axis 76 on an arm pivoted about axis 73 and connecting it by a link to a pivoted arm 79. By turning knob 81, arm 79 is pivoted to adjust the position of floating axis 76. Movement of axis 76 to the left serves to shift the control point upwardly.

As shown in the drawings, the pressure in pipe 57 is connected by a pipe 82 to a conventional diaphragm valve motor 83 which, as the pressure increases, moves valve 84 toward closed position to reduce the speed of the engine 85 (Figure 1) and which, as the pressure decreases, acts to open the valve.

Assuming now that the discharge pressure of the pump increases due to a change of load, the pressure in measuring element 69 increases tending to move the floating arm 64 clockwise to raise the flapper 50, and to decrease the nozzle-back-pressure. But the reaction between the nozzle-flapper pilot valve, the relay valve, and the proportioning bellows proportionally reduces the pressure in bellows 59 and on diaphragm motor 83, and proportionately closes valve 84 to reduce the speed of engine 85 to keep the discharge pressure of the pump from increasing as far as it would have increased had no control action been made. Meanwhile the pressure in bellows 90 also starts to reduce by reason of air flow from it to pipe 57. This tends to bring about further decrease in pressure in bellows 59, and further correction of the valve motor. This action continues as long as the pump discharge pressure is away from its control point value. It is known as the reset action.

The reverse action takes place when the discharge pump pressure decreases.

Turning now to control unit B, its parts are identical to those of control unit A, and are identified by the same numerals with the suffix "a." Its measuring element 69a is connected by line 48a to the intake pressure of pump 86, and its control point value may be changed in the same manner as the controller unit connected to the output pressure of pump 86. The output pressure of control relay 54 goes to proportioning bellows 59a.

The only difference between the two control units is that because unit B is controlling to prevent the intake pressure from going below a minimum value, its disc 68a has been rotated to change the action of measuring element 69a on control unit B. Thus rotated, when pressure in element 69a decreases, the nozzle-back-pressure decreases and the pressure in bellows 59a decreases. This is the reverse of the control action of unit A.

As above pointed out, bellows 59 and 59a and valve motor 83 are connected in parallel, and the pressure in all three is always the same. Further, because in practice there is rarely more than a small pressure difference existing between the pressure in bellows 59 and its opposing bellows 90, and in opposing bellows 59a and its opposing bellows 90a, it may be assumed that the pressure in all four bellows is always the same. Also, as will appear, the control unit whose nozzle-flapper pilot valve has the lowest air bleed resistance and so the lowest nozzle-back-pressure does the controlling, i. e., establishes the pressures in the four bellows and the control pressure on valve motor 83.

Referring to Figures 1 and 2, the following example is illustrative of the manner in which the control units operate selectively to control the discharge and intake pressures of pump 86 from the single valve 84. Let us assume also that by setting knob 81 the control point value of control unit A is set for 825 lbs. This means that when equal pressures exist in bellows 59 and 90 and when the discharge pressure is below 825 lbs., flapper 50 covers nozzle 51.

Turning now to control unit B, here we can assume that the control unit is adjusted to have a control point value of 25 lbs. and so long as equal pressures exist in bellows 59a and 90a and the pump intake pressure is above 25 lbs., flapper 50a will cover nozzle 51a.

With the above assumptions, so long as the intake pump pressure is above 25 lbs., nozzle 51a is held covered by flapper 50a, and as a result its air bleed resistance is maintained at maximum value. But under these circumstances, control unit A will act to control the discharge pressure to endeavor to maintain it at the control point value of 825 lbs. The pressure that control unit A delivers to the diaphragm motor 83 is whatever value is required to position valve 84 to supply power to engine 85 to run pump 86 at the speed to maintain the discharge pressure of 825 lbs. This is accomplished by the above-described reaction between nozzle 50, flapper 51, control relay 54 and bellows 59 and 90 under the influence of the measuring element 69.

But if the pump intake pressure drops to its value of 25 lbs., then element 69a acts to raise flapper 50a from the nozzle 51a with the result that the air bleed resistance is reduced and the pressure in bellows 59a reduces to maintain the nozzle-flapper in operating relationship.

As a further result, control unit B now acts to supply the pressure to diaphragm motor 83, control the speed of the engine and pump to slow the pump to control the pump speed to maintain the intake pressure at 25 lbs.

Meanwhile, the reduction of pressure in the bellows 59a is also transmitted to the bellows 59 and flapper 50 closes over nozzle 51 to establish its maximum air bleed resistance, and so its nozzle-back-pressure, and control unit A no longer acts to control the air pressures to the diaphragm 83.

At the time control unit B takes over control, the pressure in bellows 59a and 90a is the same as that in bellows 59 and 90. Consequently the shifting of control from control unit A to control unit B is accomplished without any abrupt pressure change, and without introducing any upset into the process.

It is because bellows 59a and 90a are continuously connected to the pressure supplied to bellows 59 during the time that control unit A is controlling that it is possible to shift from control unit A to control unit B at the control point value of control unit B.

From the foregoing it is evident that if, while control unit B is controlling the pump discharge pressure rises to its control point value of 825 lbs., flapper 50 will be raised from nozzle 51 with the result that control unit A will immediately take over the control from control unit B.

Thus the present combination permits accurate limit control and assures that the control from one variable shifts to the other variable at the desired control point limit value.

The foregoing description has assumed a condition in which the upper limit value of the pump discharge pressure was one limit and the lower limit of the pump intake pressure was the other limit. The novel controller combination is equally useful for controlling two or more upper limits or two or more lower limits. Thus, for example, let us assume that the controller combination is utilized to control the temperature of an oven heated by an external heater. Such operation frequently calls for preventing the heater from going above a predetermined maximum temperature value even though the oven temperature drops below its normal operating temperature. To this end, control unit A may be made responsive to the oven temperature, and control unit B to the heater temperature. For this control installation the discs 68 and 68a of both units A and B are adjusted so that temperature increase produces a decrease in output control pressure. In this example let us assume that control unit A is adjusted to have a control point of 700°, and that increasing controller output pressure opens the valve 84 supplying heat energy to the heater. We can assume also that unit B is adjusted to have a control point of 1000°:

As long as the heater temperature is below 1000°, measuring element 69a of control unit B holds flapper 50a closed over nozzle 51a, and control unit A controls the temperature of the oven by supplying pressure to valve 84 to supply whatever heat is required to the heater to maintain the oven temperature at 700°.

But should the heater temperature rise to 1000°, control unit B assumes control because its measuring element 69a would raise flapper 50a from nozzle 51a to reduce the air bleed resistance, and a lower nozzle-back-pressure would reduce the pressure in bellows 59a, with the results described in connection with the previous description.

But as soon as, or in the event of, the oven temperature rising to 700°, control unit A would assume control in the same manner that control unit B assumes control, and for the same reasons.

The invention is also useful when a control unit having only proportional control function is combined with a control unit having proportional-plus-reset control characteristics. In such a combination, it is the provision of the same control pressure being delivered to the bellows of both control units that assures that the control unit with the reset control characteristics will always assume control whenever the variable to which it is responsive reaches its control point setting.

Control units A and B have been described as having proportioning-plus-reset control characteristics. The invention may also be used with control units having added to the proportioning or proportioning-plus-reset control characteristics a derivative control characteristic that makes a quantitative control pressure change proportioned to the rate of change of the measuring element. This may be accomplished, as described in the above-mentioned Philbrick patent, by adding to unit A or B a restriction between pipe 57 and the follow-up bellows. Here again, because of the parallel connection between the bellows, the control transfers smoothly at the desired limits without upsetting the process.

Figure 2 has been described as showing two control units, but it is understood that more than two control units may be combined by merely connecting the output pressure of the control relay in parallel with the follow-up bellows of the added control units, and connecting the nozzle-back-pressures in parallel with the control relay.

Although it is a relatively simple matter to combine at the factory two standard control units as shown in Figure 2, because of difficulties of altering connections inside of the instrument case to provide the proper pneumatic circuits in control units already installed in the field, it may be difficult to combine more than two control units that are already in the field. To this end provision is shown in Figure 3 by which two or more control units may be conveniently combined in the field to embody the invention.

Referring to Figure 3, control units A, B and C are shown, each with a measuring element 69, 69a and 69b. In this embodiment the pressure supplied to the valve motor 83 by line 82 is also supplied to the follow-up bellows 59, 59a, and 59b of the control units by pipe 103 and by branch pipes 104, 104a and 104b. But instead of having a single control relay, the control relays 54, 54a and 54b of each control unit are maintained intact. The output of control relay 54 goes through a 1:1 relay 105a and through a second 1:1 relay 105b to the pipe 82. Output of relay 54a is connected by pipe 106a to relay 105a, and output of relay 54b is connected by pipe 106b to relay 105b. The output pressures of control relays 54a and 54b are dead-ended at the relays 105a and 105b, respectively.

Each relay 105a and 105b contains a flexible diaphragm 107 on which the pressure from the control relay acts. Diaphragm 107 carries a valve seat 108 and a passage to atmosphere 109.

One side of the relay is connected to pipe 110 which comes from control relay 54, and the other side of the relay is connected by pipe 111 with relay 105b. A stationary valve seat 112 in the relay is at one end of a passage connecting pipes 110 and 111. A double-ended valve 113 pushed upwardly by spring 114 controls the flow of air from pipe 110 to pipe 111, and controls the flow of air from pipe 111 to the atmosphere.

Relay 105b is identical with relay 105a, and it is understood that as additional control units are added a similar relay is added for each control unit.

The control units A, B and C are of the same type as shown in Figure 2, and the operation is essentially the same. The control unit having the lowest air bleed resistance (i. e., trying to establish the lowest nozzle-back-pressure) assumes control. Also, decrease of nozzle-back-pressure results in decrease of control output pressure. The control pressure is applied to all the follow-up bellows in parallel.

We will assume an operation in which control unit A is controlling, and control units B and C are idle. Under this condition the measuring element of control unit B is holding its flapper over its nozzle and maximum output of its control relay 54a is being delivered to the relay 105a. This holds diaphragm 107 down, holds valve seat 108 against the top of double-headed valve 113, and holds the bottom of double-headed valve 113 clear of seat 112. This provides a passage connecting pipes 110 and 111, freely passing air from control relay 54 to pipe 111. The same condition exists in control unit C.

Thus, the output pressure of control relay 54 passes through pipes 110, 111, 103 and branch pipes 104, 104a and 104b to the proportioning bellows 59, 59a and 59b exactly as if the bellows 59, 59a and 59b were connected directly with the output pressure of control relay 54. This control pressure also goes through pipe 82 to diaphragm motor 83 operating the control valve.

But should the measuring element of the control unit B move its flapper away from its nozzle ever so slightly to reduce the nozzle-back-pressure, its control relay instead of supplying maximum pressure to diaphragms 107 of its relay, will supply a minimum pressure to the relay with the result that the diaphragm 107 will rise, thereby throttling the flow of air through passage 110 and opening valve seat 108 to connect pipe 111 through passage 109 to atmosphere. The result is a reduction in pressure in the pipe 111 and the proportioning bellows 59a to maintain the nozzle and flapper in their operating relationship. This establishes whatever pressure is required by the measuring element to do the controlling.

But as soon as the pressure in the line 103 lowers, bellows 59 of control unit A lowers and closes its flapper 50 against nozzle 51, thereby causing its relay valve 54 to deliver maximum output pressure to the relay 105a. The relay 105a now acts as the control relay to supply the proportioning bellows 59a with whatever pressure is required to hold the nozzle and flapper in operating relationship. Thus, the relay acts just as though it were connected directly to the nozzle-back-pressure of unit B and to the bellows 59a. As before, the transfer of control from control unit A to control unit B takes place at the control point setting of unit B because the bellows of unit B have been supplied with the same pressure that existed in bellows 59 while control unit A was controlling.

Control unit B will continue to control until either control unit A or control unit C assumes the control by reason of their nozzle-back-pressures dropping below that of the control unit doing the controlling. Control unit A will take over the control as soon as its measuring element causes flapper 50 to leave nozzle 51 thereby to reduce the nozzle-back-pressure and so the output pressure of control relay 54. This results in lowering the pressure delivered to relay 105a and in lowering the pressure in bellows 59a. Pressure drop in bellows 59a moves its flapper to close its nozzle, and the increase in nozzle-back-pressure causes its control relay 54a to supply its maximum pressure to fully open relay 105a, which again merely acts as an unrestricted passage, as previously described.

Control unit C takes over the control from control unit B whenever the measuring element of control unit C moves its flapper 50b away from the nozzle, thereby causing relay 105b to throttle the pressure in pipe 111 and to lower the pressure in bellows 59b to the value necessary to maintain the nozzle-flapper of control unit C within its operating range. But this lowering of the pressure in bellows 59b also occurs in the same way in bellows 59a with the result that the flapper of control unit B closes its nozzle and causes its control relay 54a to supply maximum pressure to the relay 105a. Thus, control unit C now controls in the same manner that control units A and B have been described as controlling.

It will be noted that in both the Figures 2 and 3 constructions, the diaphragm motor 83 and the follow-up bellows of the control units are all connected in a parallel pneumatic circuit so that at all times the same control pressure exists in each of the follow-up bellows. This means also that the pressures in the reset bellows of each of the control units will be substantially the same, thereby insuring that each unit will take over control when its control point limit value is reached, raising its flapper from its nozzle.

It is noted further that the pneumatic circuit arrangement is such that movement of the measuring element of any one of the control units tending to raise its flapper from its nozzle results in a tendency of the other control units immediately to cause their flappers to cover their nozzles and thereby create maximum air bleed resistance. This is accomplished by the interconnection and conjoint action of the several nozzle-back-pressures of the control relay mechanisms which assures separation of the actions of the measuring elements of each of the control units not controlling from affecting or acting on the pressures existing in the follow-up bellows of the inactive control units.

Since many embodiments might be made of the present invention and since many changes might be made in the embodiment disclosed herein, it is to be understood that the foregoing description is to be interpreted as illustrative only and not in a limiting sense.

I claim:

1. In control apparatus for selectively controlling a plurality of interdependent variables each with respect to a separate limit value by positioning an operator regulating a manipulated variable affecting said variables, in combination, a pneumatically-operated control unit for each interdependent variable, each including a measuring element, a bleed-type pilot valve having a variable air bleed resistance capable of establishing a variable nozzle-back-pressure, pneumatic follow-up bellows and at least one of said units having reset bellows, and connections for operating said bleed-type pilot valve by said measuring element and said pneumatic and follow-up reset bellows, connections making said measuring elements respectively responsive to the values of said interdependent variables, a pneumatic motor positionable by air pressure to position said operator to regulate said manipulated variable, a pneumatic circuit continuously connecting said follow-up bellows and said pneumatic motor in parallel, and a source of air pressure for said pneumatic circuit under the conjoint control of said bleed-type pilot valves.

2. In control apparatus for selectively controlling a plurality of interdependent variables each with respect to a separate limit value by positioning an operator regulating a manipulated variable affecting said variables, in combination, a pneumatically-operated control unit for each interdependent variable, each including a measuring element, a bleed-type pilot valve having a variable air bleed resistance capable of establishing a variable nozzle-back-pressure, pneumatic follow-up bellows and at least one of said units having reset bellows, and connections for operating said bleed-type pilot valve by said measuring element and said pneumatic and follow-up reset bellows, connections making said measuring elements respectively responsive to the values of said interdependent variables, a pneumatic motor positionable by air pressure to position said operator to regulate said manipulated variable, a pneumatic circuit continuously connecting said follow-up bellows and said pneumatic motor in parallel, and a source of air pressure for said pneumatic circuit, relay valve mechanism operatively interconnected with said bleed-type pilot valves and conjointly operated thereby, regulating the supply of air from said source of air pressure to said pneumatic circuit in response to the nozzle-back-pressure established by the lowest air bleed resistance to change the pressure in said pneumatic circuit in response to change of value of the interdependent variable connected with the control unit establishing the lowest air bleed resistance.

3. In control apparatus for selectively controlling a plurality of interdependent variables each with respect to a separate limit value by controlling an operator regulating a manipulated variable affecting said variables, in combination, a plurality of pneumatically operated control units of the position follow-up type and having proportioning and reset bellows, each responsive to a separate one of said interdependent variables and each having a bleed-type pilot valve, relay valve mechanism associated with said control units, the output pressure of which relay valve mechanism reduces with reduction of air bleed resistance of the bleed-type pilot valves, a pneumatic motor operating said operator, and a pneumatic circuit continuously connecting the follow-up bellows of said control units and said pneumatic motor in parallel, the pressure in said pneumatic circuit being controlled by said relay valve mechanism, whereby at all times said follow-up bellows and said pneumatic motor are subject to the same pressure.

GERALD I. BILYEU.

No references cited.